(12) United States Patent
Tozer

(10) Patent No.: US 6,454,018 B2
(45) Date of Patent: Sep. 24, 2002

(54) GROUND SURFACE DEBRIS COLLECTION MAT

(75) Inventor: Warwick Brook Tozer, Nunwading (AU)

(73) Assignee: Aero-Tech PTY LTD, Victoria (AU)

( * ) Notice: Subject to any disclaimer, the term of this patent is extended or adjusted under 35 U.S.C. 154(b) by 9 days.

(21) Appl. No.: 09/727,589

(22) Filed: Dec. 4, 2000

(30) Foreign Application Priority Data

Dec. 2, 1999 (AU) .............................................. PQ4467
Dec. 3, 1999 (AU) .............................................. PQ4440

(51) Int. Cl.$^7$ ............................. E01H 1/00; A01B 31/00
(52) U.S. Cl. ......................................... 172/29; 172/611
(58) Field of Search ........................... 172/29, 611, 612, 172/445.1, 684.5, 189, 197, 199; 37/219, 221, 222

(56) References Cited

U.S. PATENT DOCUMENTS

| 768,358 A | * | 8/1904 | Davis ........................... 172/611 |
| 1,061,709 A | * | 5/1913 | Ward ........................... 172/612 |
| 1,350,512 A | * | 8/1920 | Mowatt ........................ 172/612 |
| 1,446,419 A |  | 2/1923 | Glerum |
| 1,448,385 A |  | 3/1923 | Bryant |
| 1,530,329 A |  | 3/1925 | Roberts |
| 1,775,316 A | * | 9/1930 | McLeod et al. ............. 172/612 |
| 1,786,194 A | * | 12/1930 | Dickinson .................... 172/611 |
| 1,997,248 A |  | 4/1935 | Densberger |
| 2,042,405 A |  | 5/1936 | Knudson |
| 2,287,133 A |  | 6/1942 | Reiter |
| 2,887,337 A |  | 5/1959 | Begue |
| 2,902,909 A |  | 9/1959 | Reissinger |
| 3,010,523 A |  | 11/1961 | Gifford |
| 3,263,755 A | * | 8/1966 | Zink ........................... 172/612 |
| 4,505,338 A | * | 3/1985 | Koval et al. ................. 172/611 |
| 4,582,142 A | * | 4/1986 | Bridge ......................... 172/34 |
| 4,651,450 A |  | 3/1987 | York et al. |
| 4,747,174 A |  | 5/1988 | Hightower |
| 4,836,295 A | * | 6/1989 | Estes ........................... 172/146 |
| 5,018,587 A |  | 5/1991 | Gandrud et al. |
| 5,183,119 A | * | 2/1993 | Wattenburg .................. 171/105 |
| 5,284,211 A |  | 2/1994 | Tozer |
| 5,305,834 A |  | 4/1994 | White |
| 5,918,684 A |  | 7/1999 | Tozer |

FOREIGN PATENT DOCUMENTS

| CH | 669 812 A5 | 2/1986 |
| DE | 26 33 215 | 1/1978 |
| DE | 295 08 830 U 1 | 11/1996 |
| EP | 0 301 153 | 2/1989 |
| GB | 640312 | 7/1950 |
| WO | WO 90/13712 | 11/1990 |
| WO | WO 95/20310 | 8/1995 |
| WO | WO 96/09440 | 3/1996 |
| WO | WO 98/29609 | 7/1998 |

* cited by examiner

*Primary Examiner*—Robert E. Pezzuto
(74) *Attorney, Agent, or Firm*—Sughrue Mion, PLLC

(57) ABSTRACT

A mat for sweeping a surface, formed of grid-like, semi-flexible material. The mat is pulled over the surface to effect the sweeping. The material has open slots (112*a*,112*b*) therethrough. The slots have a leading edge and a trailing edge disposed transversely relative to the direction of travel of the mat. Ground debris can pass upwardly through each slot, over the respective railing edge to collect on an upper surface of the mat. Over the upper surface, the grid-like material defines an array of first apertures (136). At least a substantial proportion of the first aperatures (136) have within them second apertures (146) of smaller size than the first apertures.

16 Claims, 9 Drawing Sheets

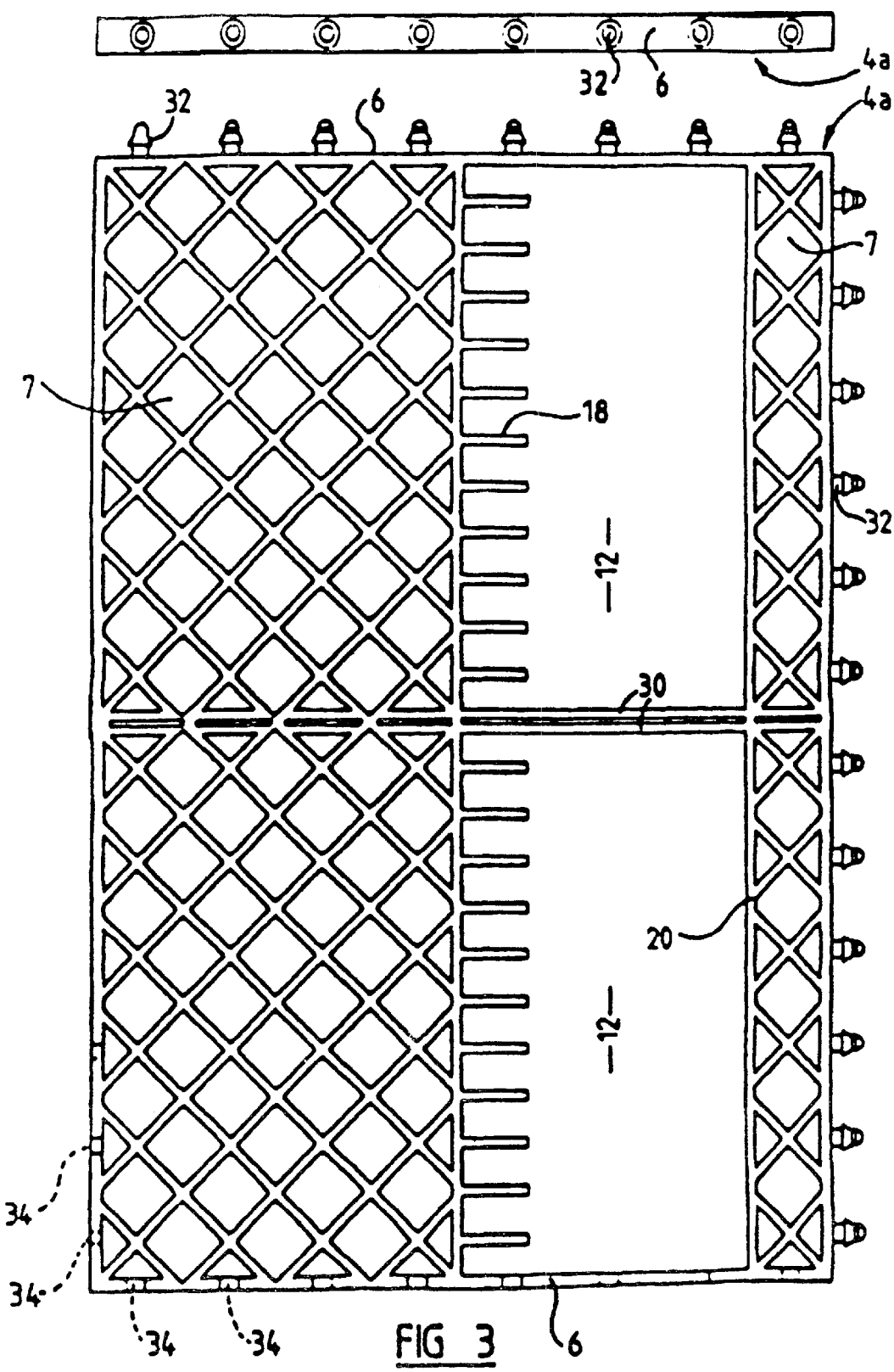

GROUND SURFACE DEBRIS COLLECTION MAT

BACKGROUND OF THE INVENTION (i) Field of the Invention

This invention relates to a mat for collecting debris such as leaves and sticks, from a surface, such as the surface of a tennis court.

(ii) Prior Art

Outside playing courts, such as tennis courts, are often prone to accumulating leaves or other debris on their surface which must be periodically removed.

Australian patent 628556 describes a mat for sweeping a surface, the mat comprising slots through which debris, such as leaves or sticks, can pass to collect on the upper surface of the mat.

The mat may be composed of a semi-flexible material, such as rubber or a suitable polymeric material.

The slots may be elongate with the longitudinal axis of each slot facing genially in the direction of travel of the mat. The trailing edge of each slot may be chamfered to lift debris onto the upper surface of the mat. The trailing edge of each slot may face perpendicularly to the direction of travel or may be inclined, for example at 45°. In the mat, all of the slots may be inclined to the direction of travel, or some may be inclined with others being perpendicular to the direction of travel.

In one particularly advantageous form, the mat is of a grid-like construction for "bagging" a clay tennis court, with portions of the grid being removed to define the slots. Thus "bagging" of the court periodically during play will also serve to remove leaves and other debris from the surface of the court.

In a particular form, the mat is of grid-like construction, presenting an array of apertures, typically of rectangular form, and about 12.5 mm side dimension, arranged with sides at about 45° to the intended direction of travel of the mat.

Arrangements as above described have been found particularly useful for, among other things, sweeping debris from tennis courts. It has now been found that by forming the unslotted part of the mat in a particular way, improved operation is achieved when cleaning certain court surfaces.

SUMMARY OF THE INVENTION

In one aspect, the invention provides a mat for sweeping a surface, the mat having slots through which debris can pass to collect on the upper surface of the mat, as the mat is passed over a surface to be swept, the mat being formed as a perforate structure having an array of first apertures therethrough, and within at least a substantial proportion the first apertures, mesh structures which, within the respective first aperture, present a respective array of second apertures of substantially smaller size than the first apertures.

The first apertures may for example be about 150 mm in area, and the second apertures may be in the range 2.25 to 25 mm$^2$, such as 9 or 10 mm$^2$. The first apertures may be formed by a grid-like structure having, for example, intersecting sets of parallel walls which cross at an angle, such as 45°. The first apertures may then be rectangular, such as square. The second apertures may be similarly formed, the mesh structures defining opposed sets of transversely disposed elements extending between opposed walls of the respective first aperture. These elements forming the mesh structure may conveniently extend parallel to opposed ones of the walls defining the first apertures.

Preferably, the elements defining the second apertures are disposed at locations at or towards the bottom edges of the walls. By this, the walls extend upwardly around the second apertures in each first aperture.

Preferably, too, the second apertures are present in a substantial portion at least, preferably all, of the first apertures spaced away from the trailing edges of at least a substantial proportion of, preferably all, the slots, and not present in at least a substantial proportion, preferably all, of the first apertures adjacent the trailing edges of the slots.

BRIEF DESCRIPTION OF THE ACCOMPANYING DRAWINGS

The invention is further described by way of example only with reference to the accompanying drawings in which:

FIG. 3 is a plan view of a mat element formed in accordance with the invention;

FIG. 4 is a side view of the mat element of FIG. 3;

DETAILED DESCRIPTION

The forms of mat shown in FIGS. 1 to 8 are first described.

Figure 1:
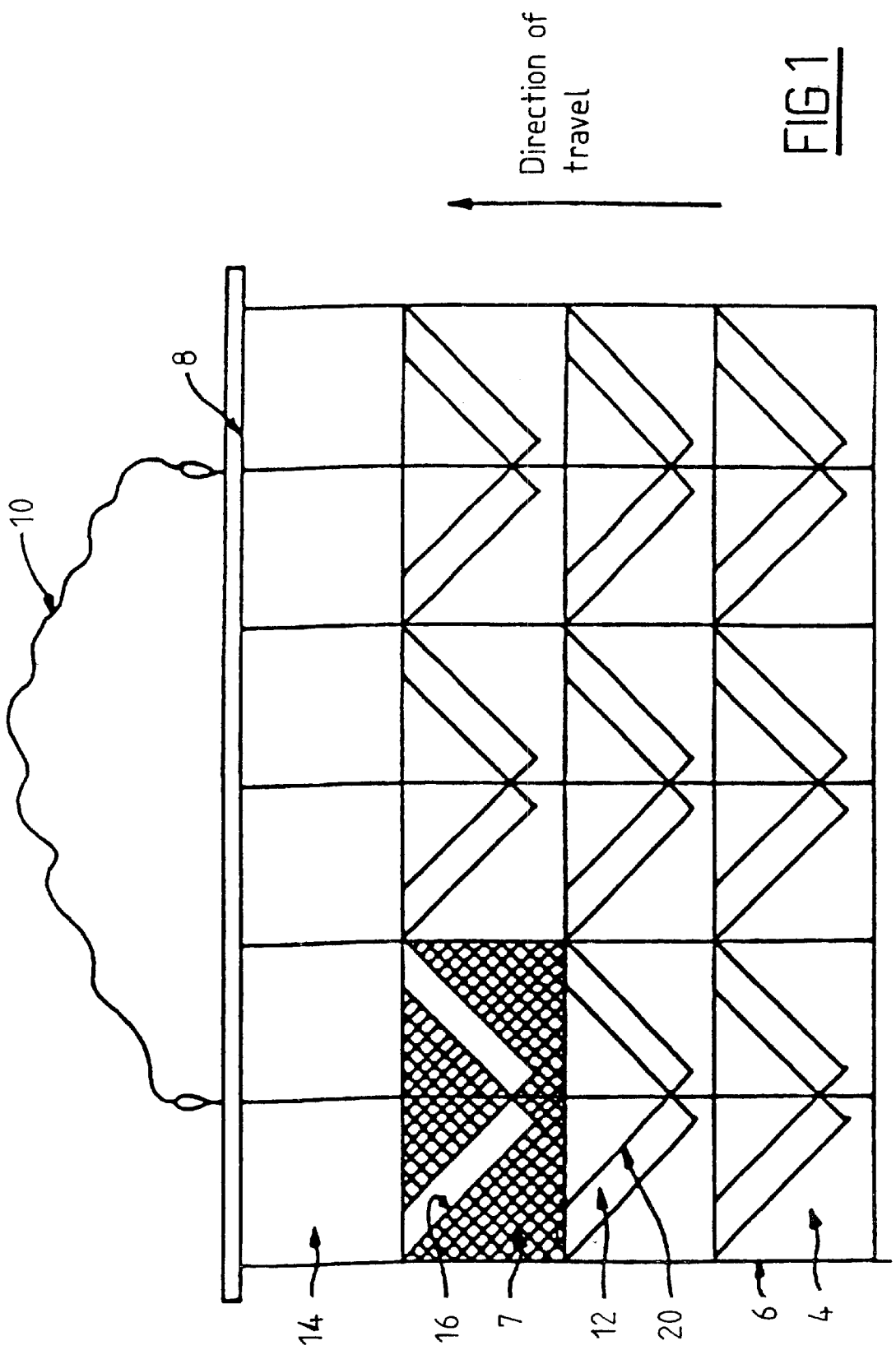
FIG. 1 is a diagrammatic plan view of a mat in accordance with Australian patent 628556 and having slots for collecting the debris.

As shown in FIG. 1, a mat for bagging a clay tennis court comprises a grid-like, semi-flexible material. Preferably, the mat is composed of rows of separately formed rectangular elements 4 each comprising an outer border 6 which surrounds a grid-like formation 7, with the axes of the grid extending approximately at 45° to the edges of the element 4. The elements 4 are fastened together to form the mat by lugs projecting from the border 6 of one element to fit into holes correspondingly formed in the adjacent border of the adjacent element. A strip 8 at the leading edge of the mat carries a rope-like handle 10 by which the mat can be dragged along the surface of the court.

At least some of the elements 4 have elongate slots 12 formed within the gridlike formation 7. It is not necessary to put the elongate slots 12 in the first row 14 of elements 4 forming the mat as this row is usually lifted at least partially from the court in the dragging action, but preferably each of the other elements is provided with a slot 12. It is not, however, essential for all of the other elements to be provided with slots and satisfactory results may be obtained if only some of the other elements have slots suitably distributed along the length and width of the mat.

The longitudinal dimension of each slot 12 is in this case parallel to that of the grid. Preferably the slots 12 of adjacent elements in the same row are oppositely inclined to define a herringbone-like pattern. Alternatively, some or all of the slots 12 may be substantially at right angles to the direction of travel.

Figure 2:
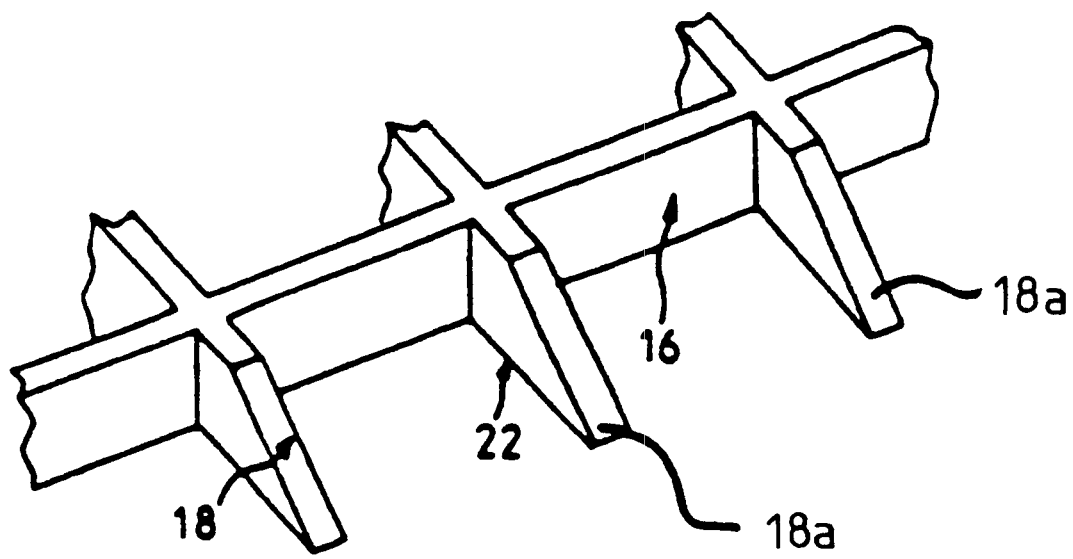
FIG. 2 is a perspective view of an enlarged scale showing part of the trailing edge of one of the slots.

As shown in FIG. 2, the training edge 16 of each slot 12 is chamfered by shaping the projecting edge portion 18 of the grid 7 which extends into the slot. As shown this forms forwardly projecting finger elements 18a. The chamfer of the trailing edge facilitates lifting of the debris onto the upper surface of the mat. The leading edge 20 of each slot 12 may also be chamfered.

In a modified embodiment having slots inclined to the direction of travel the projecting edge portion 18 of the grid 7 may be angled so as to be aligned directly in the direction of travel of the mat. The lower edge 22 of the projecting edge portion 18 may also extend below the lower surface of the grid 2 to further facilitate the lifting action of the debris onto the upper surface of the mat.

As the mat is dragged along a clay court in order to bag the surface, this will also have the effect of collecting the debris, such as leaves, from the court by passing through the slots onto the upper surface of the mat. Although all of the debris will not necessarily be collected in a single pass, successive baggings of the court will serve to completely remove all of the debris. The slots also act to educe the frictional drag of the mat.

Although the mat particularly described is primarily designed for a clay court in order to remove debris while bagging the court, the mat can also be used on a synthetic grass court or other grassed surfaces, such as lawns or playing fields, just for the purpose of removing leaves or other debris. The mat has also proven effective in gathering leaves and other debris on hard surfaces, such as concrete and "Plexipave".

The mat may also be used to sweep a beach or other surface in order to remove debris. For this purpose the mat need not necessarily be of grid-like construction. When the debris is likely to consist of bottles and other relatively larger matter, the slots will be of an appropriate size to accommodate this.

Figure 5:
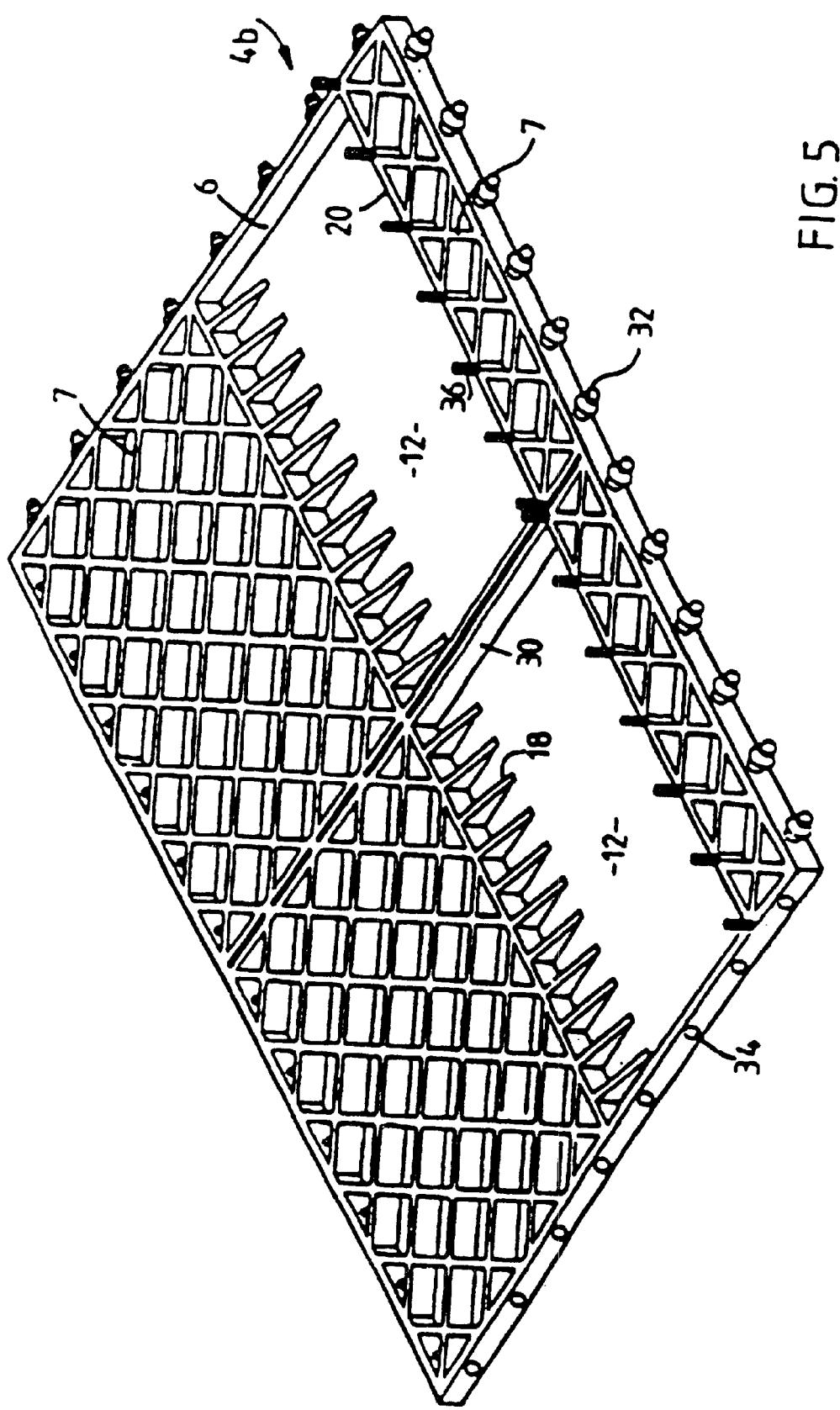
FIG. 5 is a perspective view of a mat element like that in FIG. 3 but incorporating a modification.

The mat element 4a of FIG. 3 and the element 4b of FIG. 5 are generally similar to that of FIGS. 1 and 2 and like reference denotes like parts in FIGS. 1, 2, 3, 4 and 5.

In these instances, the slots 12 extend from side to side of the elements, while front to rear extending central strengthening ribs 30 are provided. FIGS. 3, 4 and 5 also show cooperating protrusions 32 and recesses 34 on the outer borders 6 which permit snap fitting of the elements together to form the mat.

In FIG. 5 the element 4b has a row of upstanding projections 36 at the part of grid-like formation defining the front edge of slot 12. These assist in the action of retaining picked up debris on the formation 7. They may be provided at additional or alternative locations on the elements 4, 4a, 4b such as at side edges or on the rear part of the formation 7. More than one row, such as staggered rows of these may be provided. The projections may be of spigot-like form, as shown, or may be otherwise formed such as by upstanding fence-like structures. The modified mat shown in FIG. 6 is of similar form to that of FIG. 1, but the component elements 4c are here of hexagonal form, as best shown in FIG. 7, with the slots 12 extending at 90° to front to rear extending parallel side portions 6a, 6b of the border 6.

The elements 4c snap fit together in similar fashion to elements 4, 4a, 4b. As shown, upstanding projections 36 are again provided in this instance. The forward portions of the elements 4c may be left together to present a saw-tooth like front edge to the mat, but we prefer to cut portions 40, 42a, 42b, 44a, 44b from elements 4c and snap fit them to the elements in the mat to form a straight edged mat. In this case, too, the elements are again provided with the front to rear extending strengthening ribs 30, these extending from front to rear pointed ends of the elements.

Figure 6:
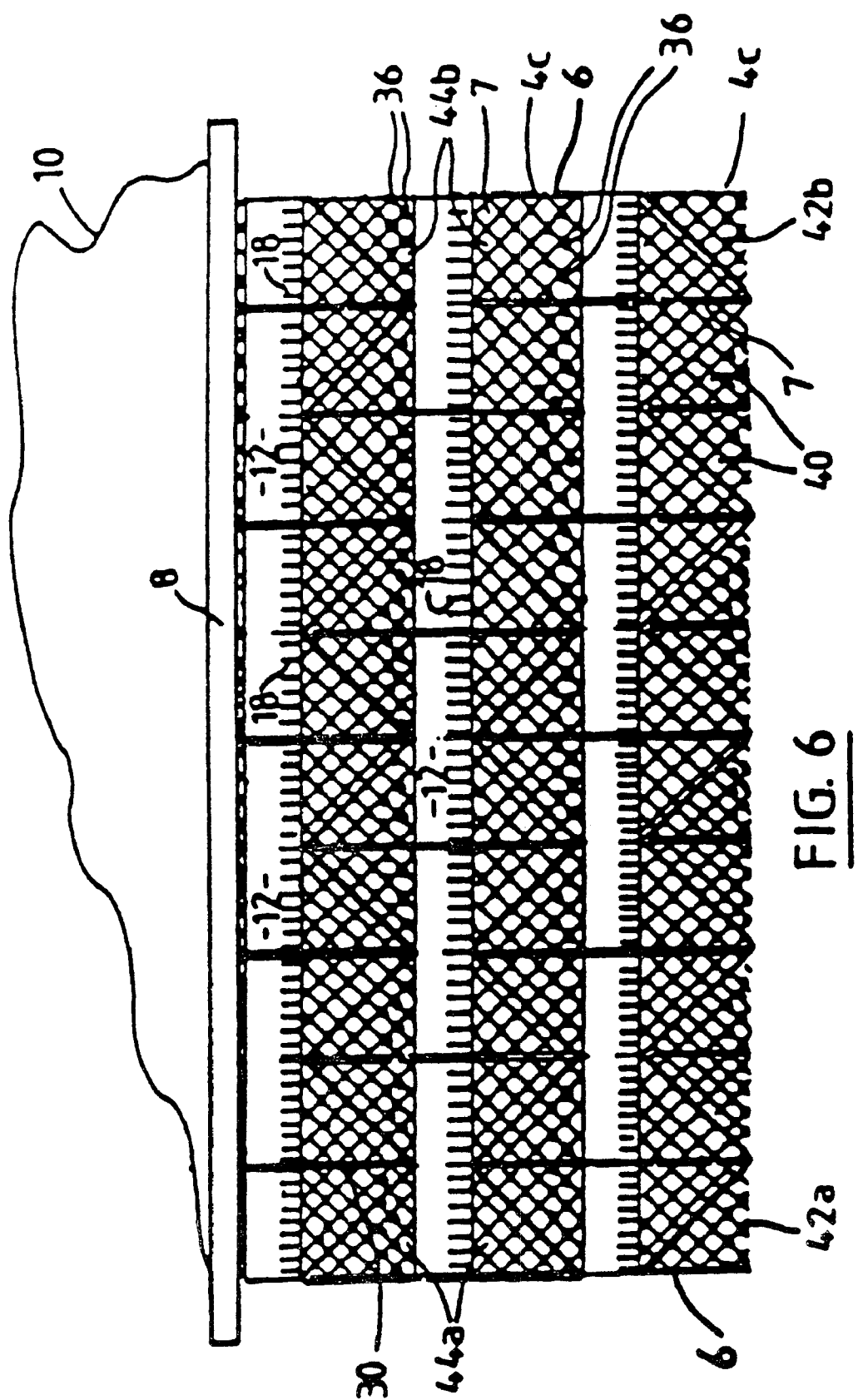
FIG. 6 is a plan view of a modified form of mat as described in Australian patent 628556.
Figure 7:
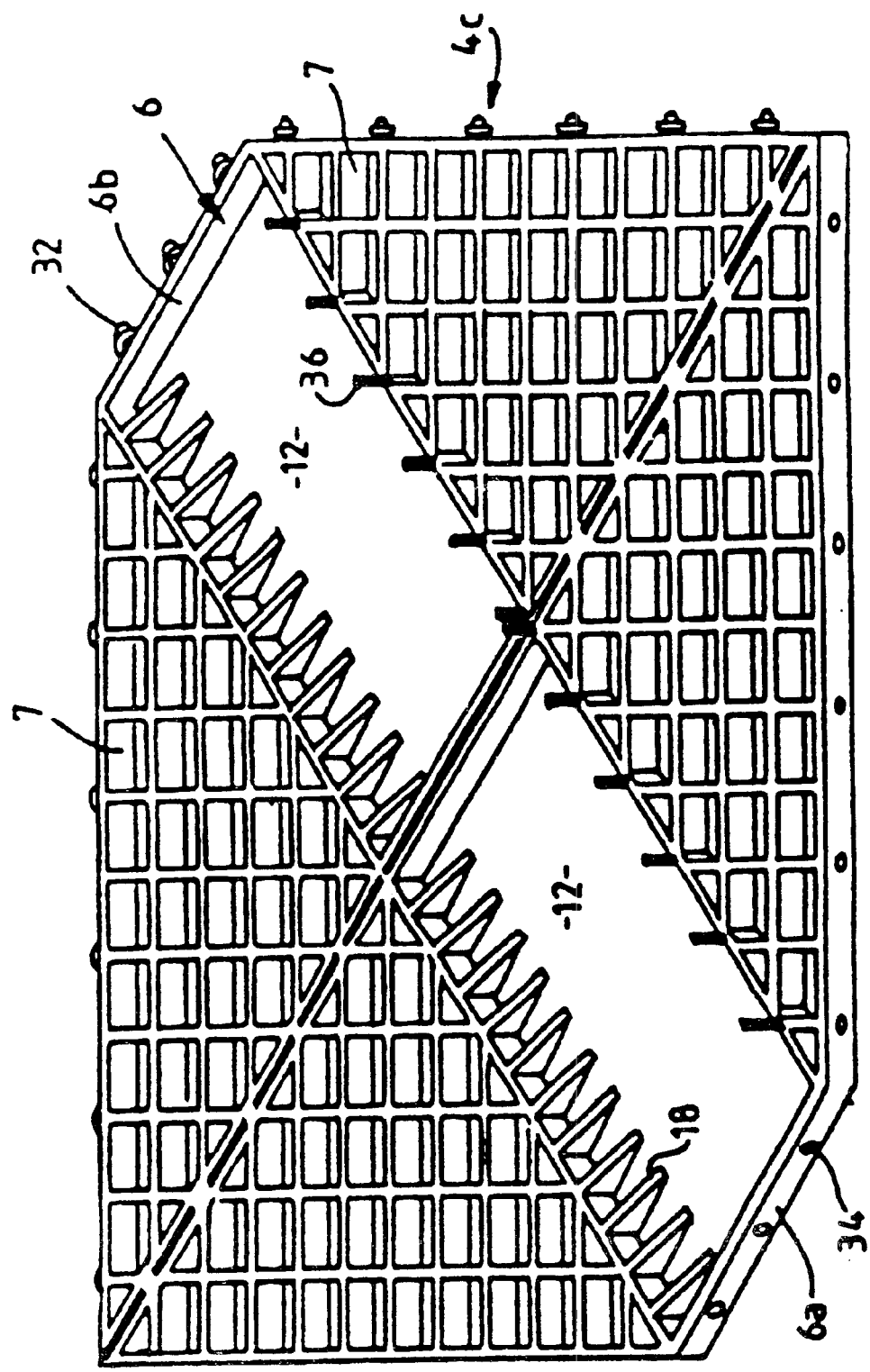
FIG. 7 is a perspective view of a mat element forming part of the mat of FIG. 6.
Figure 8:
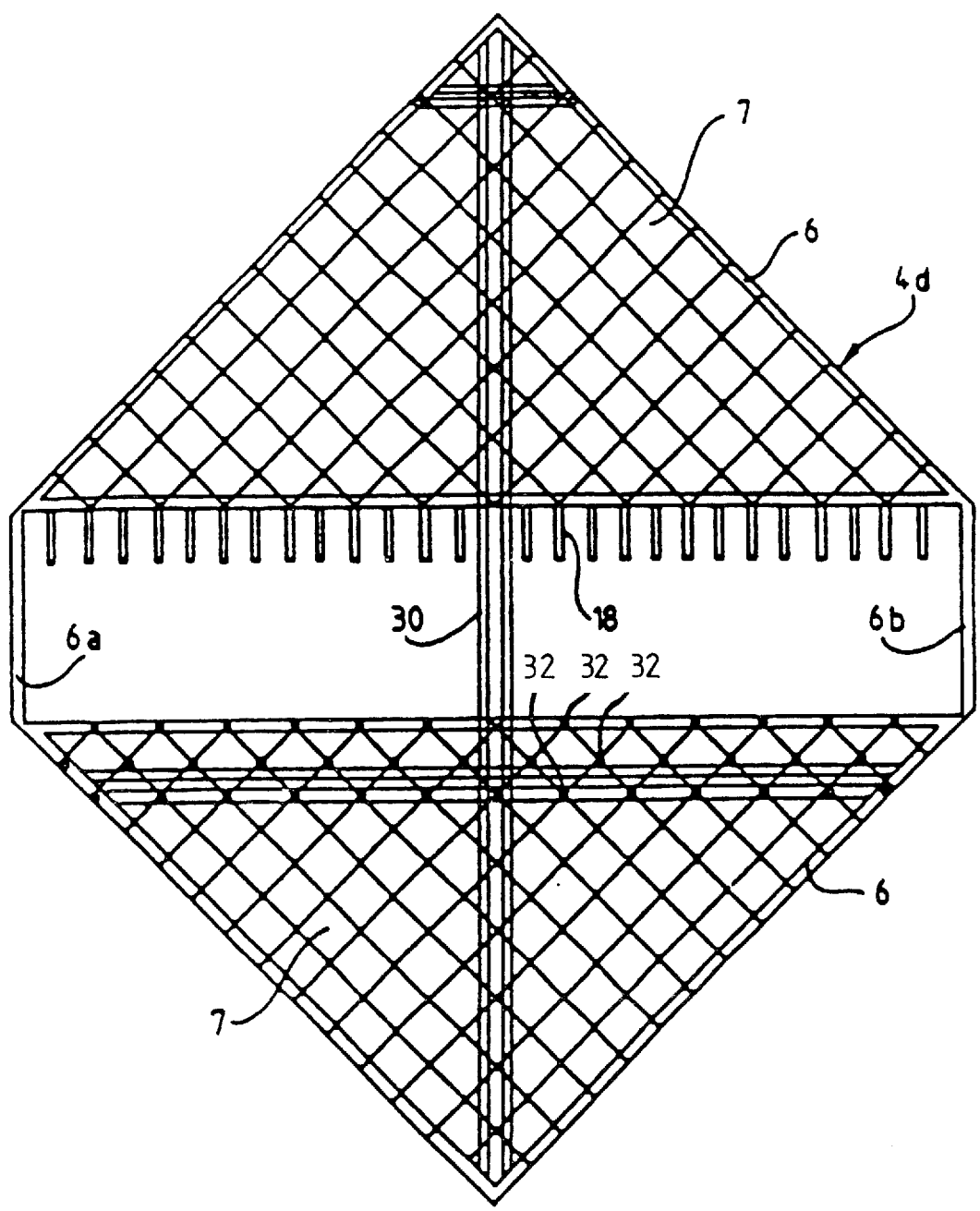
FIG. 8 is a partly diagrammatic plan view of another form of mat element described in Australian patent 628556.

The mat element 4d of FIG. 8 is somewhat similar to that of FIGS. 6 and 7.

The mat elements 4c and 4d have the slots 12 positioned mid way between front and rear ends thereof, but these slots may be positioned closer to the front or rear ends. The former is shown in FIGS. 6, 7 and 8. In any event, as shown, the slots in side-by-side elements 4c or 4d may be aligned in the side to side direction of the mat.

The described mat is formed from, for example, plastics materials but could be formed from other materials. For example, it may be formed from relatively hard material such as metal.

Preferably though even in this case it should form a relatively flexible and/or resilient structure. In any event too, the structure, however formed, may be of different scale, such as larger, than the sizes employed in the exemplary constructions which are designed mainly for use on tennis courts with total side to side dimensions of the order of two or three meters. The term "mat" as used in this specification is to be understood as encompassing such differently constructed or differently sized structures.

Figure 9:
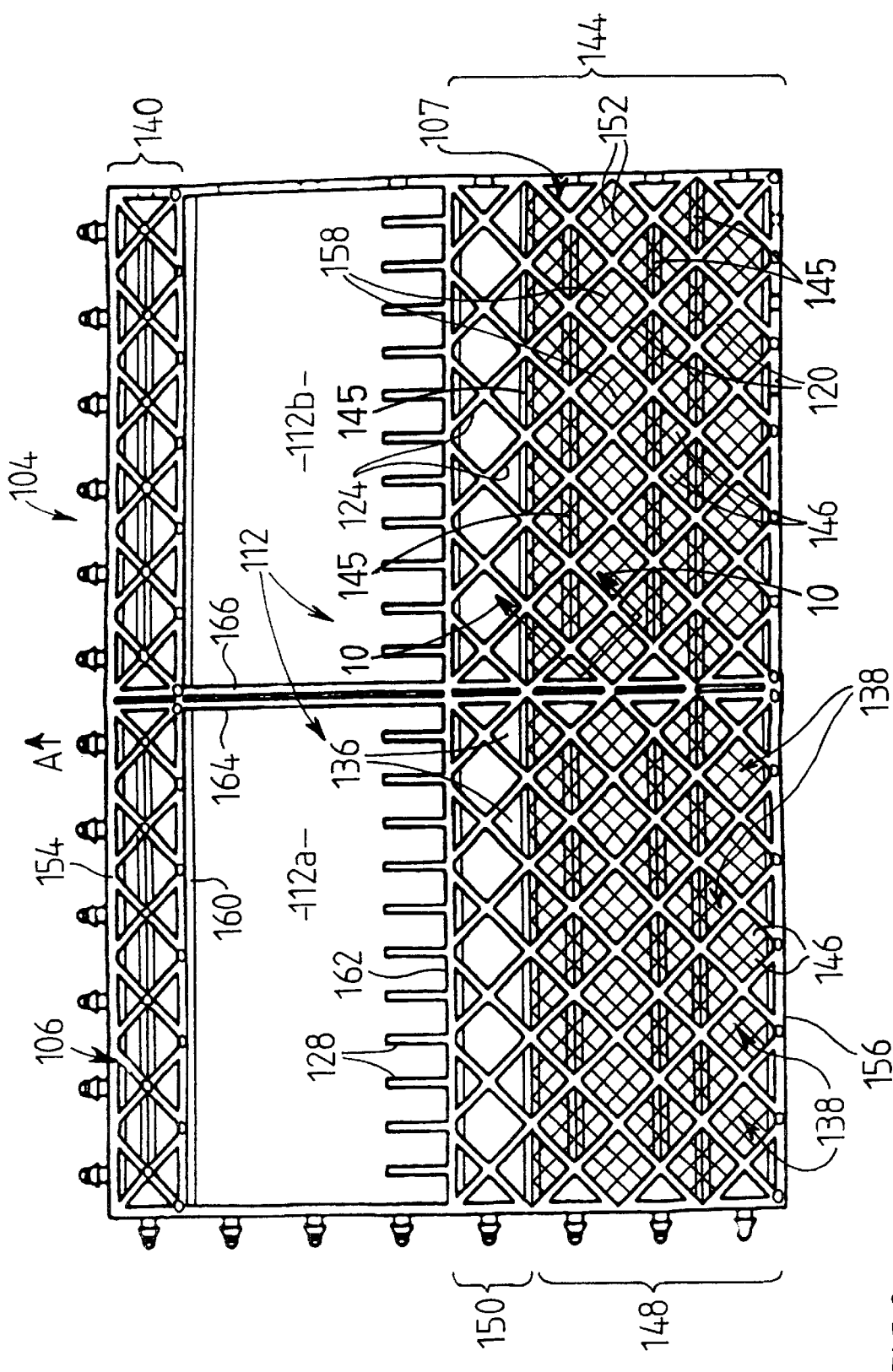
FIG. 9 is a top view of a mat element, similar to that shown in FIGS. 3 and 4, but modified in accordance with the teaching of this invention.

Referring now to FIG. 9, there is shown therein a top view of a mat element 104 constructed in accordance with this invention. This is similar to the mat element 4a shown in FIGS. 3 and 4 in that it is formed of a grid-like semi-flexible material. In particular, the element 104 has an outer border element 106 with a substantial part of the interior within the border element being formed as a grid-like structure 107. The grid-like structure 107 is formed of a series of parallel walls 120 which are arranged to extend transversely to another series of parallel walls 124 with the walls 120 being traverse and, in this case, normal to the walls 124. This grid-like structure is present over a leading edge portion 140 of the element 104 and also over a trailing edge portion respectively adjacent to forward and rear portions 154 and 156 of the outer border element 106. The walls 120, 124 may be of a similar form to corresponding walls defining the grid-like structure in FIG. 3, as evident, for example in FIG. 5. These walls are of somewhat rectangular cross-section, elongate the vertical direction, They may extend at angles of 45° to the direction of travel "A" of the mat.

As shown, the portion 140 extends only about 1/10 of the length of the mat element 104 reckoned in the direction of travel "A" of the mat. Portion 140 is bounded, as mentioned, at its forward end by border element portion 154 and is also bounded at its rear end by a transverse wall 160. The portion 144 is bounded at a forward end by transverse wall 162 and at its rear end by portion 156 of the border element 106. Portion 144 occupies about a half of the lengthwise dimension of the element 104. Between the walls 160 and 162, there is defined an elongate side-to-side extending slot 112 which is divided at the centre thereof into two portions 112a, 112b by a strengthening pair of forward to rearward extending ribs 164, 166, which also extend through portions 140 and 144 to join with forward and rearward portion 154, 156 of border element 106.

Finger elements 128 extend forwardly in parallel disposition from wall 162 into the slot 112 about 30% of the dimension of the slot 112 in the forward to rearward direction. These may be formed in the same way as fingers 18 in the embodiment of FIGS. 3 to 5.

The grid-like pattern of the grid structure 107 from which the mat element 104 is formed defines an array of first apertures 136 each bounded at two opposed sides by parts of adjacent walls 120 and of the other two sides by parts of adjacent walls 124. These first apertures 136 may be of dimension 12.5 by 12.5 mm.

In accordance with the teachings of the invention, there are provided over a substantial proportion of the first apertures 136 in the portion 144 of the mat element 104, mesh structures 138 which divide the respective first apertures into a number of smaller second apertures 146. In this case nine such second apertures 146 are provided in a substantial proportion of the first apertures which are positioned in a part 148 of portion 144 of the mat element 104, being that part which extends forwardly from the wall portion 156 to a transverse line about 2 cm behind the wall 162. That is to say the first apertures at a part 150 immediately behind the wall 162 and thus immediately behind the slot 112 are left with first aperatures 136 which do not have therewithin the mesh structures 138. As shown, the mat element 104 has side to side extending downwardly depending bars 145 at its underside, and a forward one of these is at the boundary between parts 148, 150.

Figure 10:
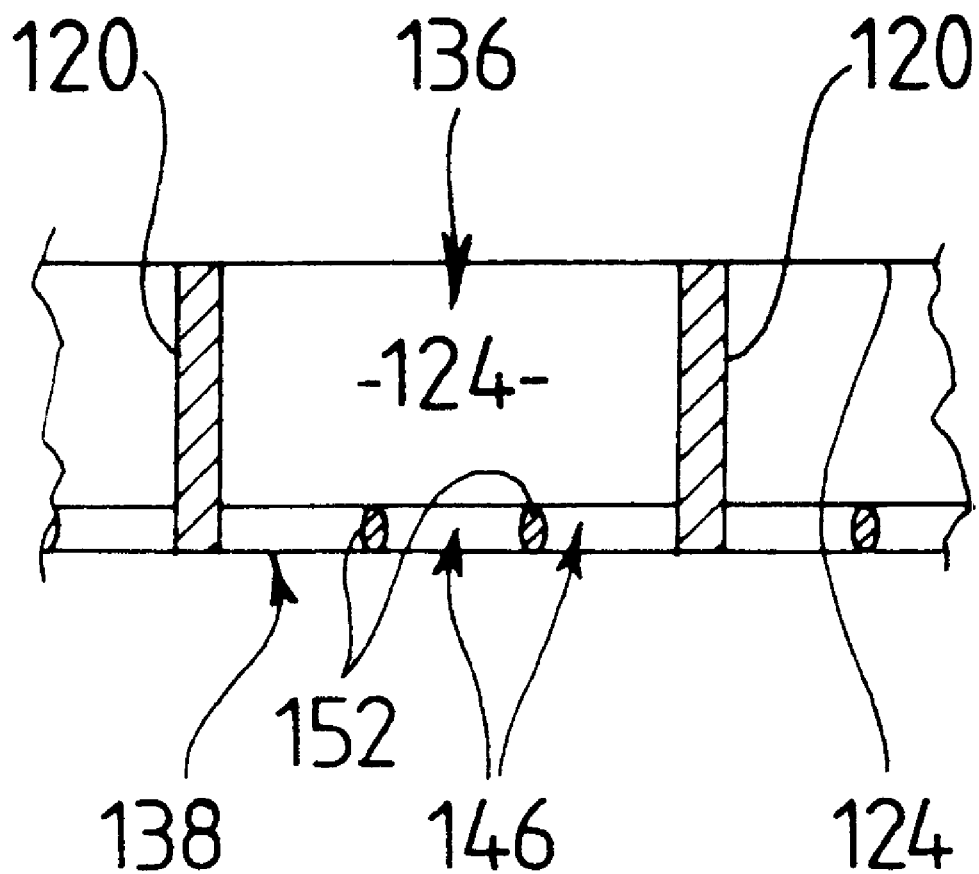
FIG. 10 is a fragmentary view on the line 10—10 in FIG. 9.

As shown, the mesh structures 138 each comprise two elongate elements 152 which extend in spaced parallel disposition parallel to walls 120 of the grid structure, and two similar parallel elements 158 which extend transversely thereto and parallel to walls 124 of the grid-like structure 107. The resultant second apertures 146 are thus square. As shown in FIG. 10, mesh structures 138 may be positioned at lower portions of the walls 120, 124 so that those portions of the walls 120, 124 surround the mesh structures and extend upwardly therefrom.

The second apertures 146 are in the described arrangement of area of roughly ⅑ to ¹⁄₁₀ the area of the first apertures. They may, for example, be of dimension 1.5×1.5 mm. Generally, it has been found that dimensions providing areas of 2.25 up to 25 mm$^2$ are satisfactory. An optimum size for many tennis court cleaning applications has been found to be about 4 mm$^2$. In the illustrated construction, the areas of the second apertures are about 9 mm$^2$, allowing for the thickness of the elements 152, 158. Generally, the second apertures are preferably substantially smaller than the first apertures, such as ¹⁄₁₀ of the area of these.

The mat element 104 can be used to form a mat in the same way as described previously in relation to the previous mat elements.

Extensive testing has shown that arrangements as described with a relatively coarse mesh screen provided by the overall mesh structure 107, together with a fine mesh provided by the mesh structures 138 enables the mat to remove small particles of debris such as gum nuts and husks, small flowers, small stones and so-on and to pick them up successfully while still allowing court surfacing material such as fine sand and crushed brick to fall back onto the court.

It has been found that leaving the part 150 without mesh structures 138 assists in preventing clogging, since there is otherwise a tendency for particulate material from the surface to collect in those first aperatures and block them completely, interfering with the action of cleaning. While not shown, the mesh structures 138 are preferably also provided in the first apertures at the forward portion 140.

It has also been found that the positioning of the mesh structures 138 at the bottom of the grid-like structure provided by walls 120, 124 (FIG. 10) assists in directing collected material to the mesh structures 138 and while still facilitating trapping of larger debris.

Particularly in the case where the structures 138 are as shown in FIG. 10 at the bottom of the walls 120, 124 defining the grid-like structure 145 it is preferred that structures such as the mentioned bars 145 be provided to maintain the lower surface of the grid-like structure 107 above the ground surface to be swept. This allows particles passing downwardly through the mesh structures 138 to be easily returned to the ground surface.

In an alternative embodiment (not shown) the mesh-like structure 107 is not present. In this case, for example, the mat element 104 which forms the portions 140 and 144, which are however simply formed from perforate material. In this case, the outer border element 106 may still be provided with the remainder of the mat for example being formed wholly or partly from a suitable perforate material. In this case, it is preferred that the bars 145 still be provided, for the purpose previously described, and also to provide structural reinforcement. In this case, there need be no first apertures, only second apertures 146. As before, the second apertures are preferably of area in the range 2.25 mm$^2$ to 25 mm$^2$, such as 9 or 10 mm$^2$ as described.

The described construction has been advanced merely by way of explanation and many modifications and variations may be made thereto without departing from he spirit and scope of the invention as defined in the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A mat for sweeping a surface comprising a substantially flat mat of grid-like material for sweeping a surface by pulling the mat over the surface in a direction of travel substantially transverse to a leading edge of the mat, the mat having at least one slot extending therethrough and disposed transversely relative to the direction of travel whereby in use of the mat, debris can pass through the slot over a trailing edge of the slot to collect on an upper surface of the mat, the mat being formed as a perforate structure having an array of first apertures therethrough, a plurality of said first apertures having mesh structures therein which present an array of second apertures of substantially smaller size than the first apertures.

2. A mat as claimed in claim 1 formed of hard material.

3. A mat as claimed in claim 2, wherein said material is metal.

4. A mat as claimed in claim 1 composed of a semi-flexible material.

5. A mat as claimed in claim 4, wherein said semi-flexible material is rubber or a polymeric.

6. A mat as claimed in claim 1, wherein the trailing edge of the slot is chamfered for facilitating lifting of debris onto the upper surface of the mat.

7. A mat as claimed in claim 6, wherein the trailing edge of the slot is perpendicular to the direction of travel of the mat.

8. A mat as claimed in claim 6, wherein the trailing edge of the slot is inclined to the direction of travel of the mat.

9. A mat as claimed in claim 8, wherein the trailing edge of the slot is inclined at 45° to said direction travel.

10. A mat as claimed in claim 9 wherein the trailing edge of the slot is provided with finger elements projecting in the direction of travel of the mat.

11. A mat as set forth in claim 10, wherein said grid-like material of said mat provides a debris support formation rearwardly of said slot having upper and lower surfaces and wherein said finger elements have an upper surface which slopes downwardly toward said leading edge of said slot and wherein a lower surface of said finger elements extends below said lower surface of said support formation.

12. A mat as claimed in claim 1, wherein a plurality of said slots are provided, said slots extending transverse to the direction of travel.

13. A mat as claimed in claim 1, wherein said slot is sidewardly elongated.

14. A mat as claimed in claim 1 formed of elements of generally rectangular configuration affixed to each other at edges thereof.

15. A mat as claimed in claim 1, wherein upstanding barrier means is provided for retaining collected debris on said upper surface of the mat.

16. A mat as claimed in claim 15, wherein said barrier means has at least one transverse row of upstanding projections.

* * * * *